(12) United States Patent
Sadil et al.

(10) Patent No.: US 7,854,124 B2
(45) Date of Patent: Dec. 21, 2010

(54) COMBINED CONTROL FOR SUPPLYING COOLING AIR AND SUPPORT AIR IN A TURBINE ENGINE NOZZLE

(75) Inventors: Andreas Sadil, Newington, CT (US); Timothy A. Swandon, Coventry, CT (US); Roger O. Coffey, Glastonbury, CT (US); Debora F. Kehret, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 846 days.

(21) Appl. No.: 11/588,884

(22) Filed: Oct. 27, 2006

(65) Prior Publication Data
US 2008/0098742 A1    May 1, 2008

(51) Int. Cl.
*F02K 1/00*    (2006.01)
*B64C 15/00*    (2006.01)

(52) U.S. Cl. ............... 60/771; 60/770; 60/242; 239/265.39; 239/265.19; 239/265.17

(58) Field of Classification Search ............ 60/771, 60/770, 242; 239/265.39, 265.41, 127.1, 239/265.19, 265.17
See application file for complete search history.

(56) References Cited

U.S. PATENT DOCUMENTS

| | | | | |
|---|---|---|---|---|
| 4,420,932 A | * | 12/1983 | Mendez et al. | 60/230 |
| 4,440,346 A | * | 4/1984 | Wiley | 239/265.39 |
| 4,440,347 A | * | 4/1984 | Madden et al. | 239/265.39 |
| 4,447,009 A | * | 5/1984 | Wiley et al. | 239/265.39 |
| 5,150,839 A | * | 9/1992 | Reedy | 239/265.41 |
| 5,794,850 A | * | 8/1998 | Gutierrez, Jr. | 239/127.1 |
| 5,797,544 A | * | 8/1998 | Ward | 239/265.37 |
| 5,813,611 A | | 9/1998 | Cires et al. | |
| 6,694,723 B2 | * | 2/2004 | Ward | 60/232 |
| 7,225,622 B2 | | 6/2007 | Petty et al. | |
| 2005/0091964 A1 | | 5/2005 | Curtelin et al. | |
| 2009/0049837 A1 | * | 2/2009 | Sadil et al. | 60/733 |

FOREIGN PATENT DOCUMENTS

| | | |
|---|---|---|
| JP | 10-103153 | 4/1998 |
| JP | 2005-042719 | 2/2005 |

* cited by examiner

*Primary Examiner*—William H Rodriguez
*Assistant Examiner*—Young Choi
(74) *Attorney, Agent, or Firm*—Carlson, Gaskey & Olds

(57) ABSTRACT

A balance pressure control is provided for flaps which pivot in a rear of a gas turbine engine nozzle to change the cross-sectional area of the nozzle. An actuator drives a sync ring to move the flaps through a linkage. A supply of pressurized air is also provided to the sync ring to assist the actuator in resisting forces from high pressure gases within the nozzle. When those forces are lower than normal the flow of air to the rear of the sync ring is reduced or blocked. A ring rotates with another ring to control both this air flow, and a supply of cooling air to an interior of the nozzle.

12 Claims, 9 Drawing Sheets

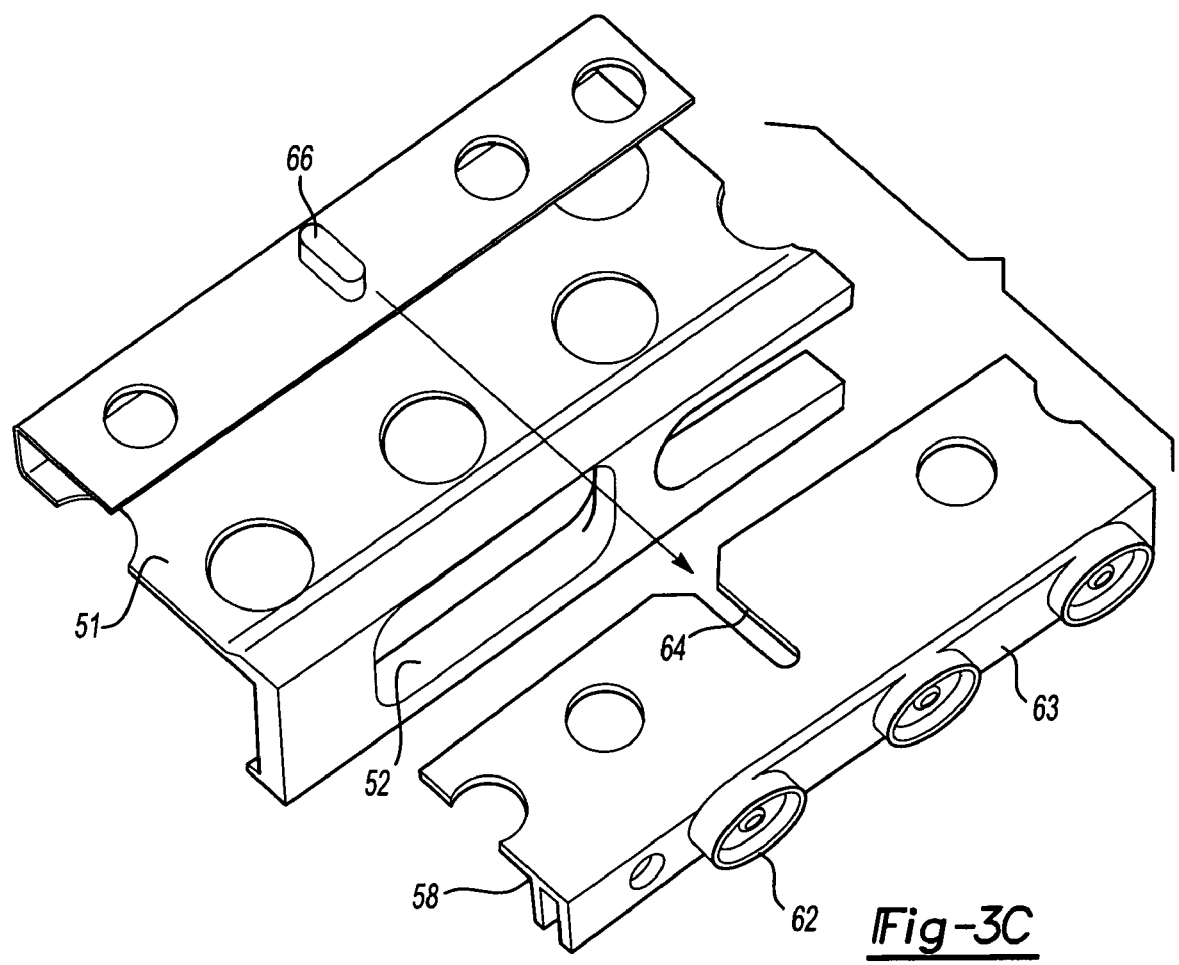

US 7,854,124 B2

COMBINED CONTROL FOR SUPPLYING COOLING AIR AND SUPPORT AIR IN A TURBINE ENGINE NOZZLE

BACKGROUND OF THE INVENTION

This application relates to a control for air pressure supplied to assist an actuator in balancing forces on a linkage for controlling a nozzle cross-sectional area in a gas turbine engine.

A gas turbine engine includes a fan section, a compression section, a combustion section and a turbine section. An axis of the engine is centrally disposed along the engine and extends longitudinally through the sections. A primary flow path for working medium gases extends axially through the sections of the engine.

The nozzle for the gas turbine engine is typically provided with an actuation structure that can cause a plurality of flaps to pivot radially inwardly or outwardly to control the size of the nozzle opening. In the prior art, a hydraulic actuator drives a synchronous ring ("sync ring"), which is connected through linkages to the plurality of flaps. A control causes the actuator to move the flaps between various positions to provide a desired cross-sectional area.

In the prior art, it is also known to supply air pressure to a rear face of the sync ring to assist in handling a load on the actuation structure. In part, this load is created since there is relatively high engine air pressure within the nozzle, and acting on an inner surface of the flaps, and relatively low ambient pressure on an outer surface of the flaps. The high pressure supplied to the rear face of the sync ring assists in carrying some of this load. However, at times, the ratio between the pressure within the nozzle and the ambient pressure is much lower. As an example, at low speed/low altitude applications the ratio is typically low. In such applications there may be too much air pressure supplied to the sync ring.

Another feature which is often positioned adjacent the nozzle, is a liner ring which controls the flow of cooling air to the interior of the nozzle. The liner ring is rotated between a blocking position and an open position dependent on whether cooling air is necessary. Under certain conditions, such as when an aircraft is hovering, less cooling air is necessary. By blocking the flow of cooling air to the nozzle, additional cooling air is available for other purposes.

SUMMARY OF THE INVENTION

In a disclosed embodiment of this invention, a liner ring as known in the art is rotated to control the flow of cooling air to the inner periphery of a nozzle in a gas turbine engine. When no cooling air is necessary, the liner ring is rotated by a motor to a position such that openings in the liner ring are not aligned with openings in a housing structure leading into the nozzle. In this position, the flow of cooling air will be blocked, and cooling air is available for other purposes in the gas turbine engine. On the other hand, during normal operation when cooling air is desired, the liner ring is rotated to a position such that the openings in the liner ring align with the openings in the housing and cooling air is delivered to the inner periphery of the nozzle. As mentioned, these features of the present invention are as known in the art.

The liner ring is also constrained to rotate with an outer ring. The outer ring is biased axially relative to the liner ring such that an end surface of the outer ring abuts a valve plate in the housing. The valve plate has openings leading to the rear surface of an actuation structure for the flap. A motor and control can rotate the liner ring and thus, the outer ring between positions selectively allowing or blocking flow to the rear of the sync ring.

By utilizing a single actuation structure, the additional feature of controlling the flow of air to the rear of the sync ring is achieved with the same motor which is already utilized to rotate the liner ring.

These and other features of the present invention can be best understood from the following specification and drawings, the following of which is a brief description.

BRIEF DESCRIPTION OF THE DRAWINGS

FIG. 3C shows a view of the liner ring and the outer ring.

DETAILED DESCRIPTION OF THE PREFERRED EMBODIMENT

Figure 1A:
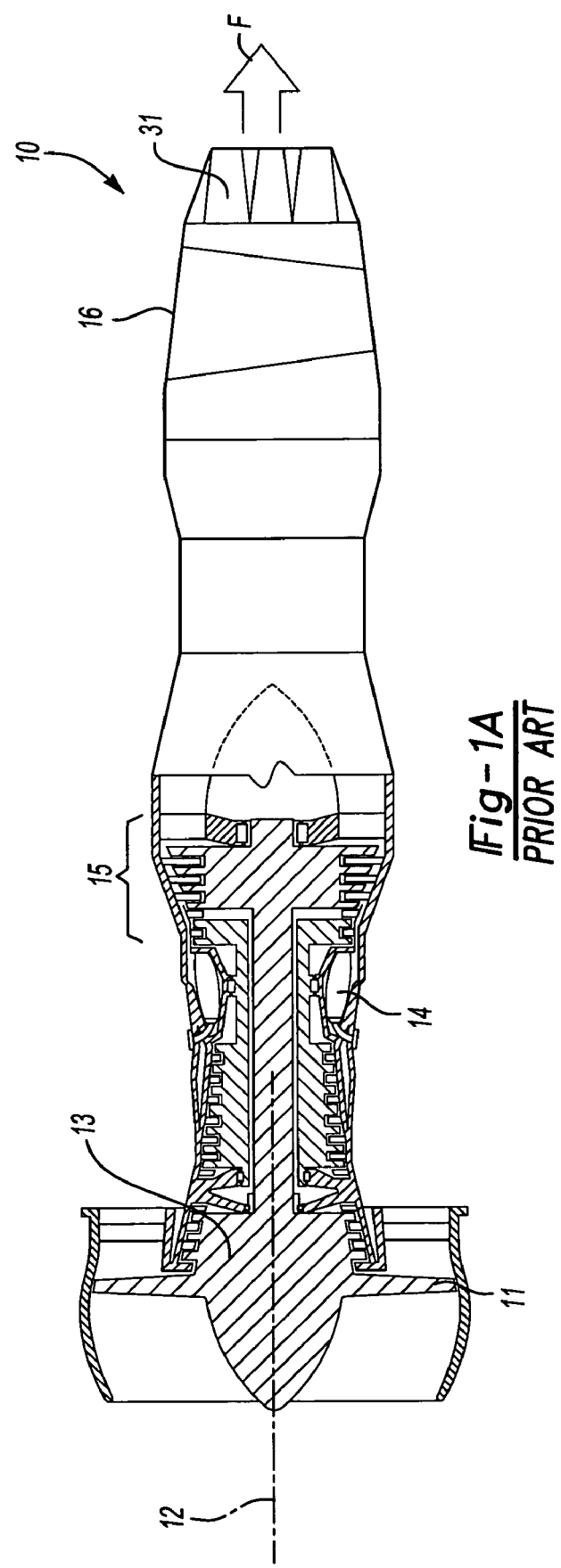
FIG. 1A schematically shows a gas turbine engine.

FIG. 1A shows a gas turbine engine 10. As known, a fan section 11 moves air and rotates about an axial center line 12. A compressor section 13, a combustion section 14, and a turbine section 15 are also centered on the axial center line 12. A nozzle section 16 of the turbine discharges gas downstream. FIG. 1A is a highly schematic view, however, it does show the main components of the gas turbine engine. Further, while a particular type of gas turbine engine is illustrated in this figure, it should be understood that the present invention extends to other types of gas turbine engines.

Figure 1B:
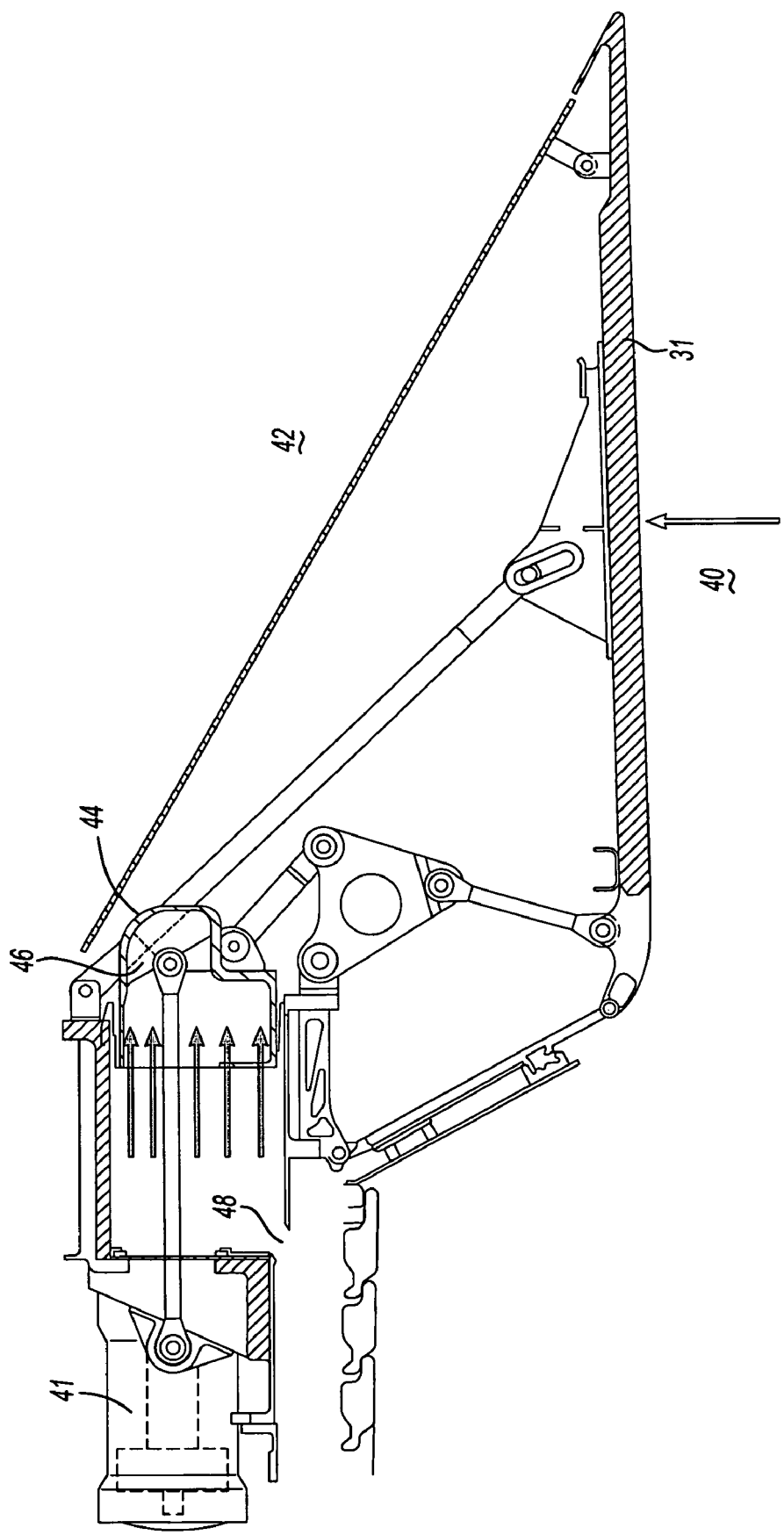
FIG. 1B shows a structure for moving a nozzle as known in the prior art.

As also shown in FIG. 1A, a plurality of flaps 31 at the end of the nozzle 16 can be pivoted radially inwardly or outwardly to control the cross-sectional area at the nozzle. This is as known in the art, and an actuation structure for pivoting the flaps 31 is shown in FIG. 1B. As shown, a hydraulic actuator 41 drives a sync ring 44 through a connection at 46. Air pressure within the nozzle 40 acts on an inner surface of the flaps 31, while an ambient pressure 42 outside the flaps 31 acts on an outer surface of the flaps 31. Typically, the air pressure at 40 is much greater than the ambient air pressure 42. This high pressure imbalance creates forces on the sync ring 44 and linkages. Thus, pressurized air is delivered through openings 48 to a rear surface of the sync ring 44 to assist in handling the load. In this prior art structure, there is no control of the flow of this air. As known, the sync ring 44 moves a plurality of linkages to move the flaps. While movement of the sync ring does cause resultant movement of the flaps, they do move independently of each other. In addition, as known, the sync ring 44 is connected to move a plurality of flaps.

Figure 2:
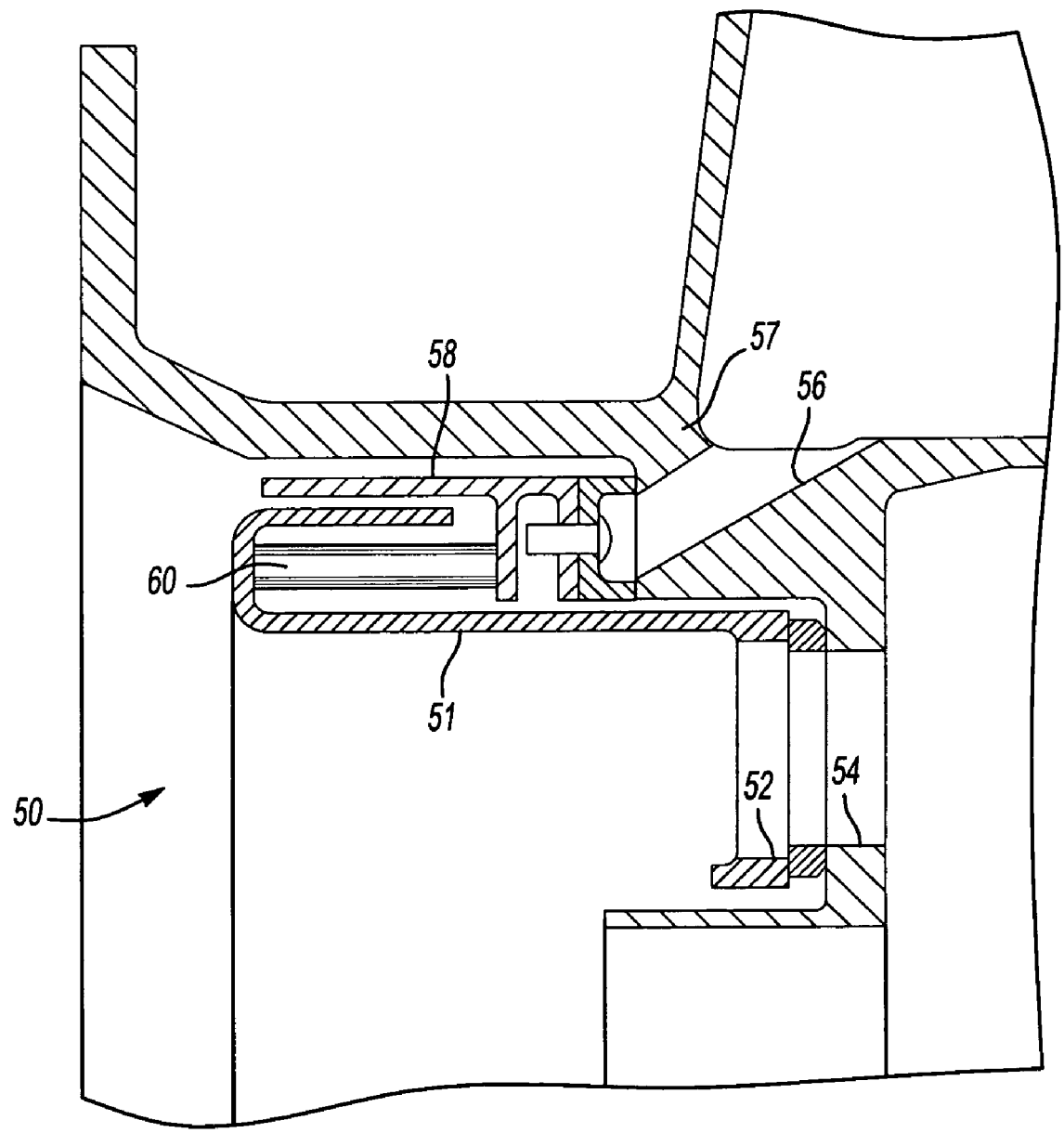
FIG. 2 shows an inventive structure to supplement the FIG. 1B structure.

FIG. 2 shows a structure which supplements the FIG. 1B actuation structure, and controls the flow of airflow into the rear surface of the sync ring 44. As shown, an assembly 50 includes a liner ring 51 having a plurality of openings 52 which can be selectively aligned with openings 54 to deliver cooling air into the inner periphery of the nozzle, and flaps 31. As shown, an outer ring 58 is positioned adjacent to the liner ring 51, and as will be explained, controls the flow of air flow through openings 56 to the rear surface of the sync ring 44 when less air flow is desired.

A spring 60 biases the outer ring 58 against the openings 56 in a housing structure 57.

Figure 3A:
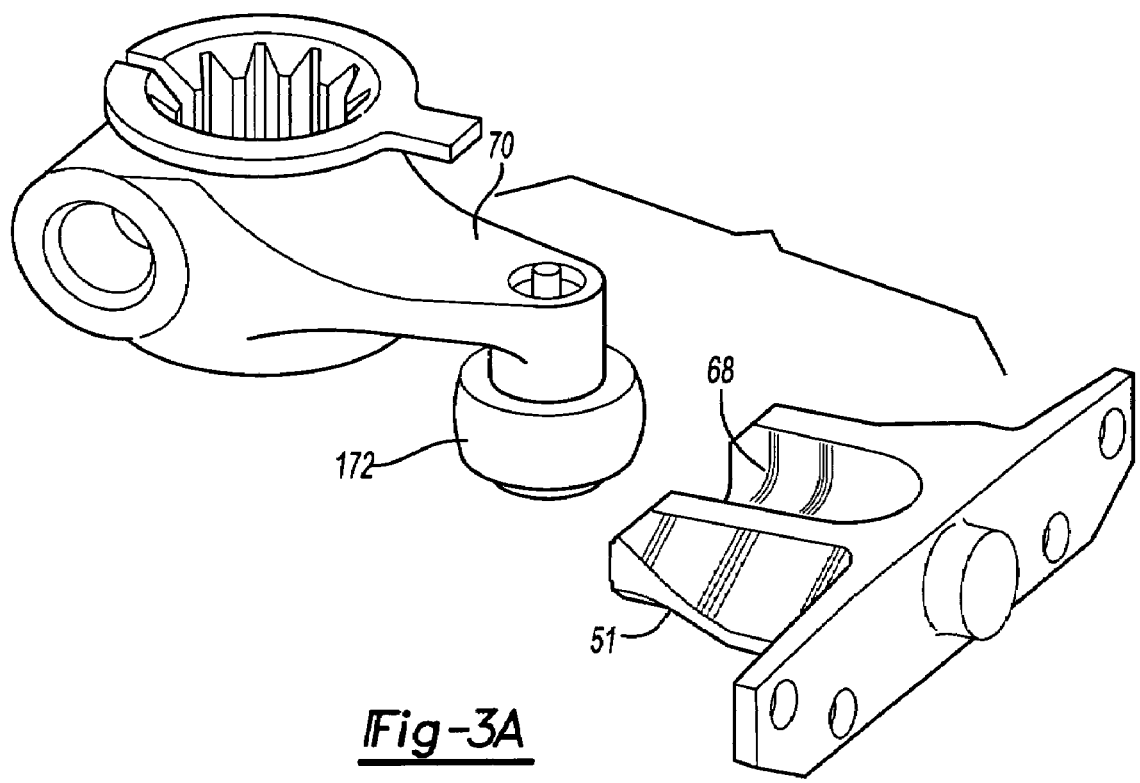
FIG. 3A shows a first feature of an actuation structure.

FIG. 3A shows details of the liner ring 51, and in particular a slot or track 68. An actuation structure 70 includes a bearing 172 which is to be received in the slot 68.

Figure 3B:
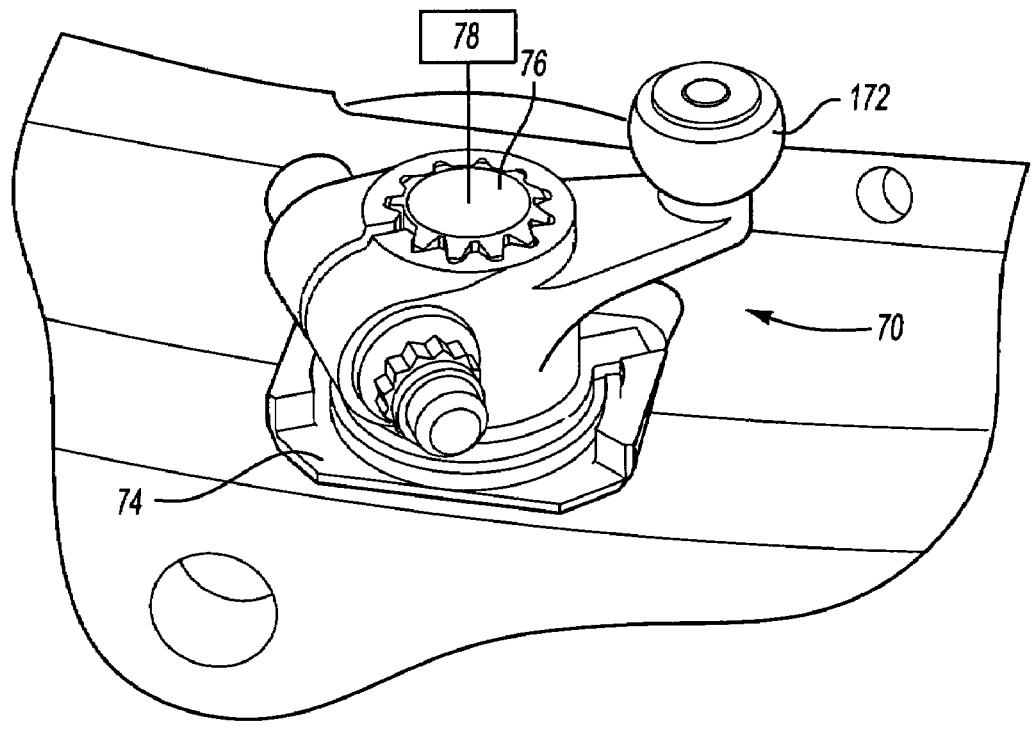
FIG. 3B shows another view of the actuation structure.

As shown in FIG. 3B, the bearing 172 is associated with a drive having a spindle 76 driven by an actuator motor 78. A restrictor plate 74 seals off the mounting of the spindle in a fixed housing. A control for motor 78 receives feedback with regard to the condition of the engine, and can determine whether airflow is desired for cooling air at the inner periphery of the nozzle, and as actuation air to supplement the air acting on the sync ring. The control and motor 78 are shown schematically, however, it would preferably include a rotary motor, and a control for selectively driving the motor.

FIG. 3C shows features of the outer ring 58, and in particular a slot 64 which is associated with a lug 66 on the liner ring 51. While a single mating structure 64 and 66 is shown, there could be a plurality of such mating structures spaced around the periphery of the rings. Further, valve closures 62 extend forwardly from a forward face 63 of the outer ring 58. When the closures 62 are aligned with the openings 56 airflow is blocked. When the outer ring 58 is rotated, closures 62 are spaced from openings 56 such that the air can flow into the openings 56.

Figure 4A:
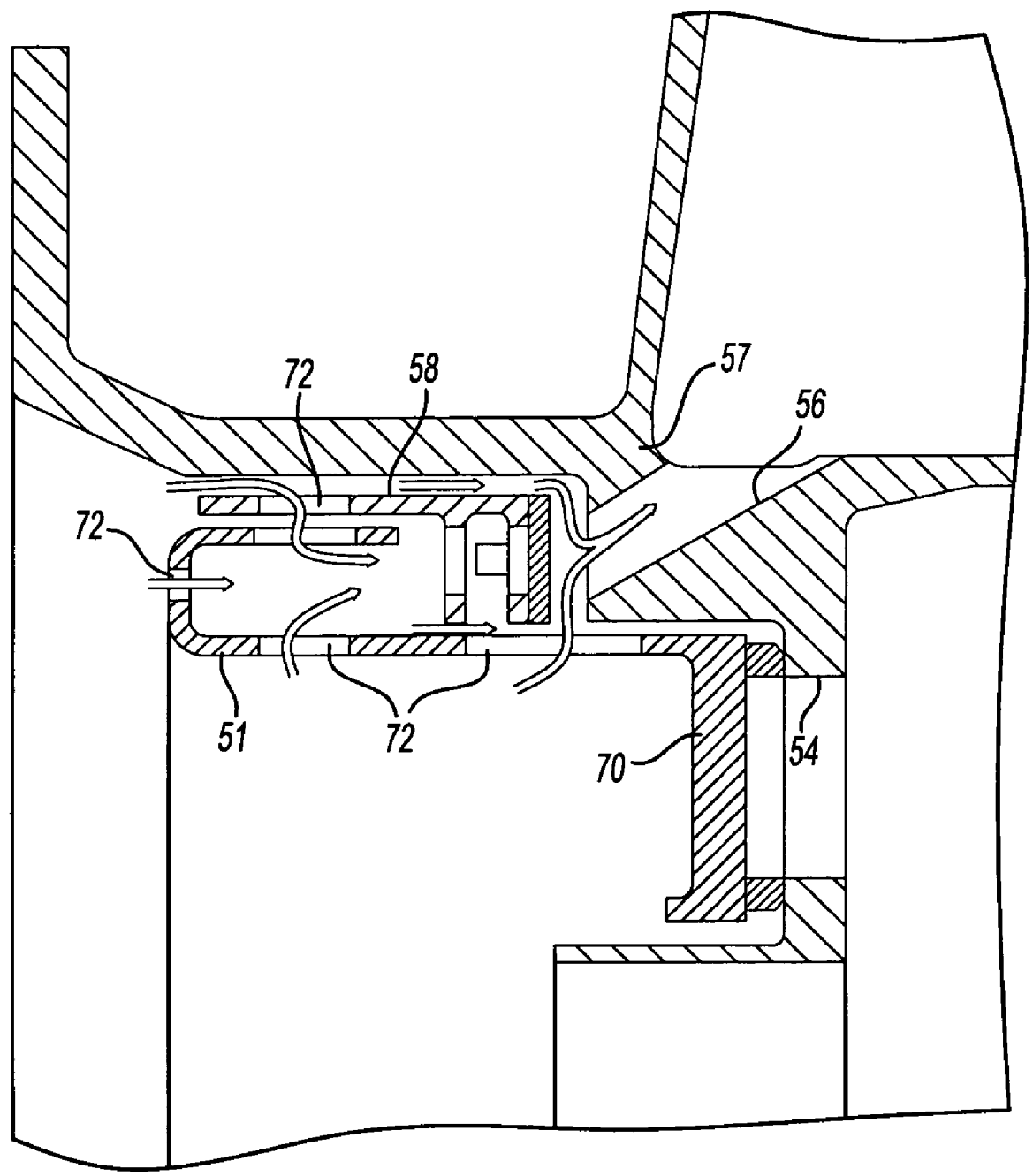
FIG. 4A shows a first operational position.
Figure 4B:
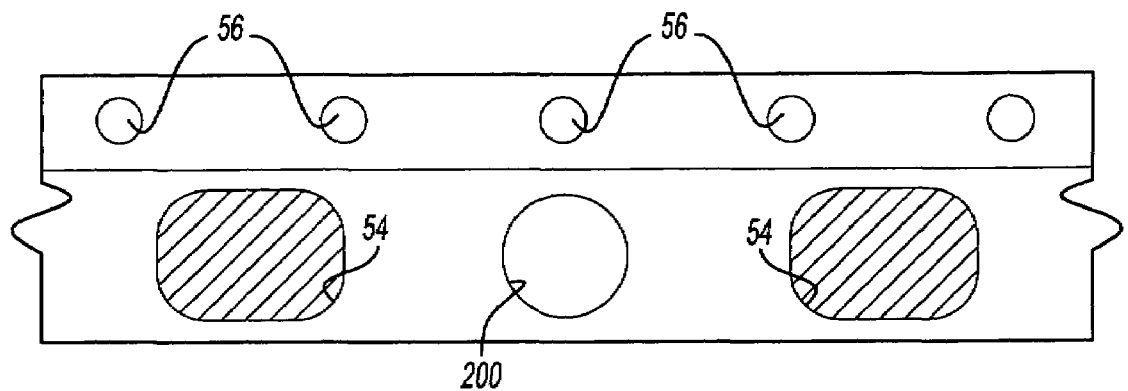
FIG. 4B shows another view of the first operational position.

FIG. 4A shows a first position which may be considered a "hover" position for an associated aircraft. In this position, the temperature within the nozzle may not be as high as sometimes are experienced. As shown, the liner ring 51 has been rotated such that solid structure 70 is aligned with the openings 54. Now, cooling air will not be delivered to the interior of the nozzle. On the other hand, air can flow through openings 72, and around the outer ring 58, and reach the openings 56 in the housing 57. FIG. 4B shows that the openings 54 are blocked while the openings 56 are open.

Figure 5A:
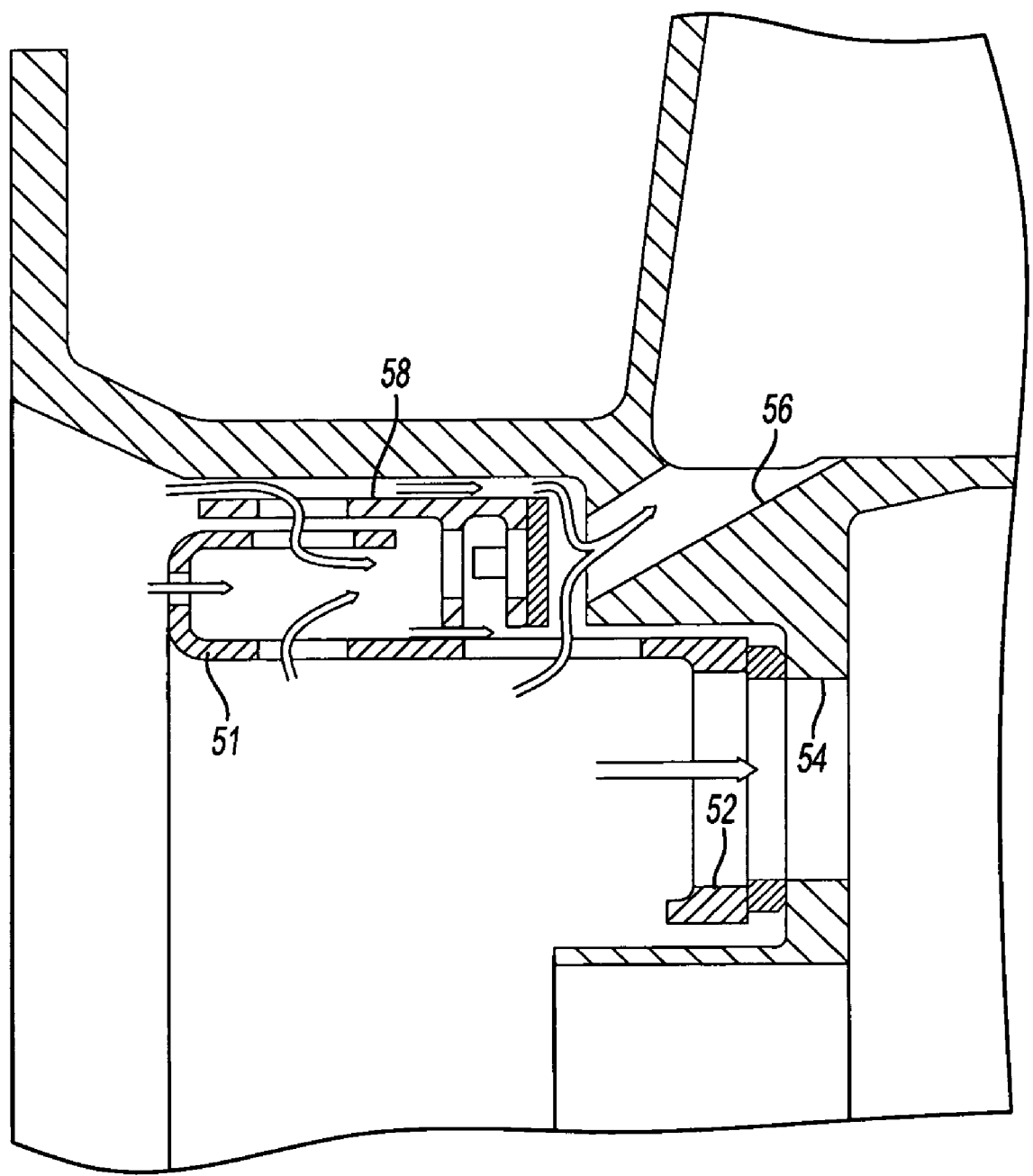
FIG. 5A shows a second operational position.
Figure 5B:
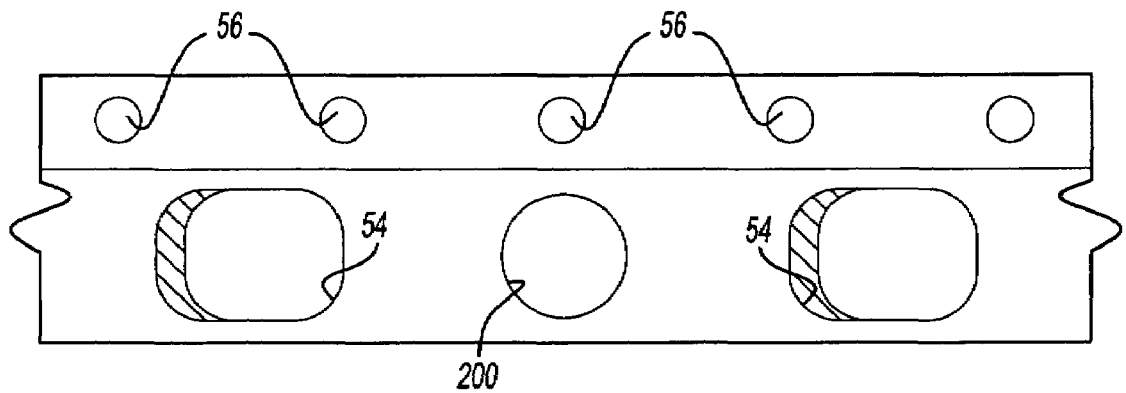
FIG. 5B shows another view of the second operational position.

FIG. 5A shows another position, such as when an aircraft carrying the inventive gas turbine engine is under normal flying conditions. In this position, the liner ring 51 is rotated such that openings 52 are aligned with the openings 54, and cooling air is provided to the nozzle. Further, the ring 58 is rotated to a position similar to that shown in FIG. 4A such that air can also flow to the openings 56. FIG. 5B shows that the openings 54 and 56 are both open.

Figure 6A:
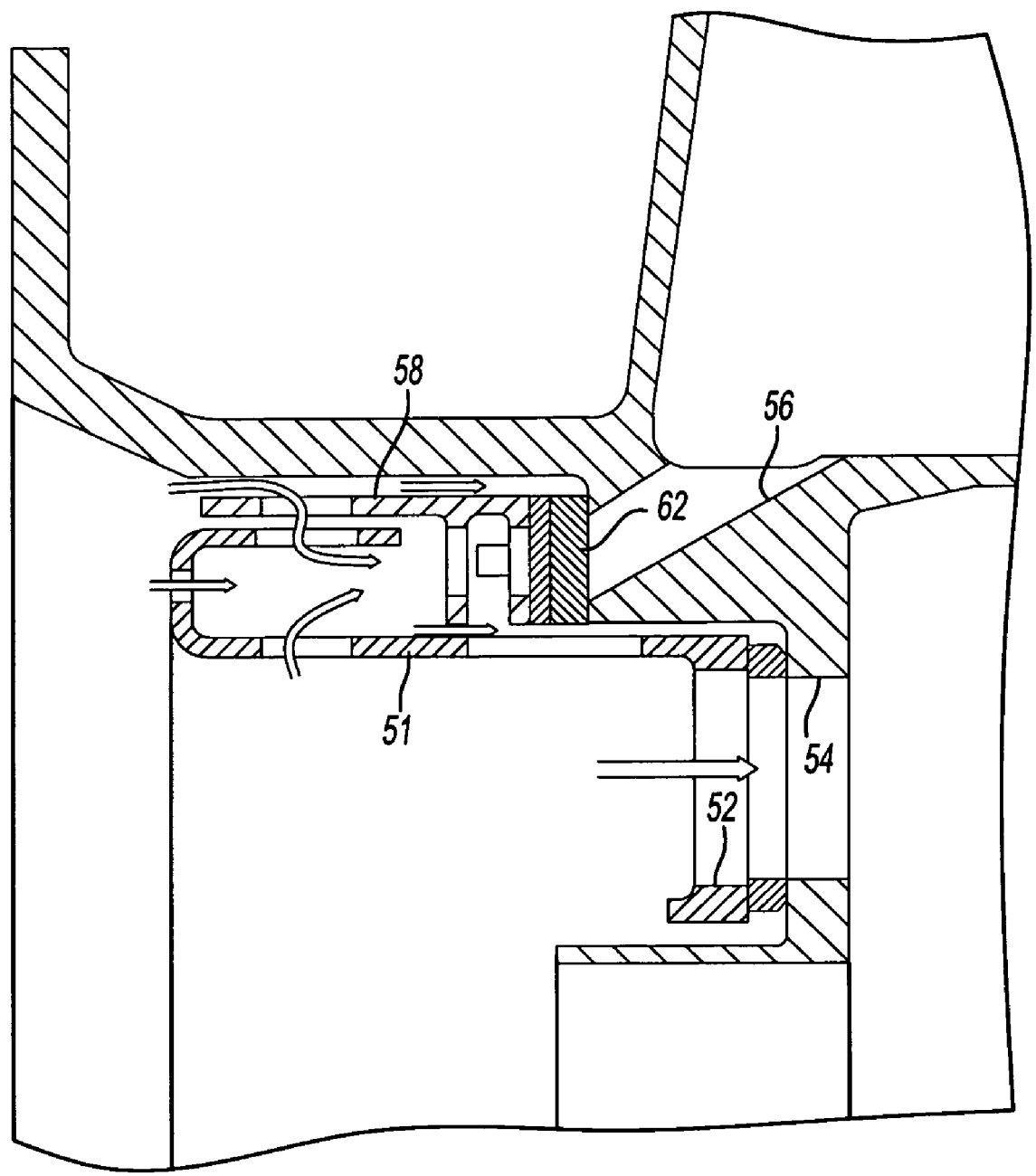
FIG. 6A shows a third operational position.
Figure 6B:
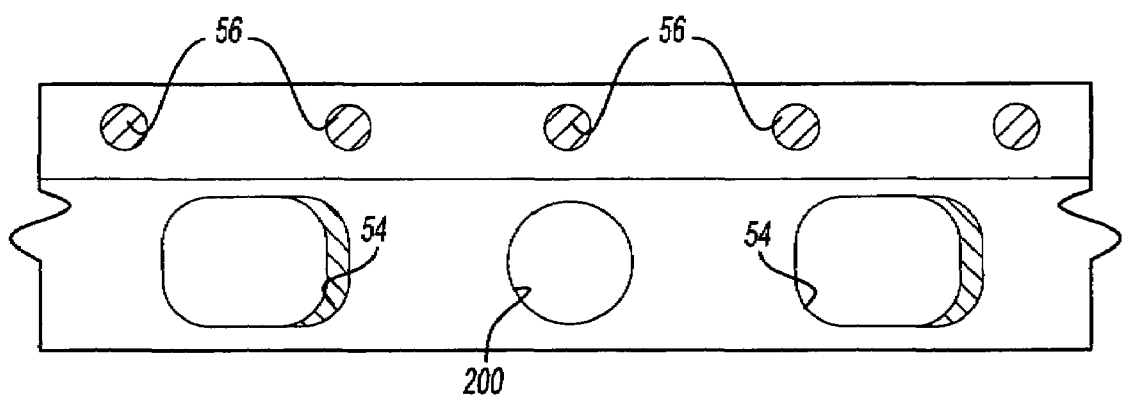
FIG. 6B shows another view of the third operational position.

FIG. 6A shows yet another position, wherein reduced airflow to the rear of the sync ring is necessary. As mentioned, such a position would typically occur at low speed and low altitude flying. In this position, the outer ring 58 is rotated such that the closures 62 block the openings 56. At the same time, the openings 54 are opened. Again, as shown in FIG. 6B, the openings 56 are blocked while the openings 54 are opened.

As shown, in positions 4B, 5B and 6B, other openings 200 ensure a minimum flow of cooling air regardless of whether openings 54 are opened or closed.

A designer would be able to selectively form structure on the two rings such that these three positions can be easily achieved by simply rotating the liner ring a particular amount.

A preferred embodiment of this invention has been disclosed. A more simplified arrangement has been disclosed in co-pending U.S. patent application Ser. No. 11/527,188, entitled "Pressure Balance Control for Gas Turbine Engine Nozzle."

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A nozzle for a gas turbine engine comprising:
   a plurality of flaps which may move to provide a desired cross-sectional area for a nozzle outlet;
   an actuator structure for driving said flaps through a linkage, said actuator structure including at least one actuator member moving the flaps through an intermediate structure;
   an air supply for supplying pressurized air to a rear surface of said intermediate structure, said pressurized air assisting said actuator member in holding said flap at a desired position, and resisting a force from pressure within said nozzle;
   a liner ring for being rotated to control the flow of cooling air to an inner periphery of said nozzle, and a valve comprising of an outer ring with valve closures for controlling flow of pressurized air to said rear surface of said intermediate member, said valve being controlled to reduce the flow of air when certain system conditions are sensed, said liner ring rotating with said valve.

2. The nozzle as set forth in claim 1, wherein a pressure ratio between the air pressure within said nozzle, and an ambient pressure is utilized to control said valve.

3. The nozzle as set forth in claim 2, wherein the flow of pressurized air to said rear surface is reduced when said ratio is less than three.

4. The nozzle as set forth in claim 1, wherein said valve is an outer ring which rotates with said liner ring, but is separate from said liner ring such that it can move axially relative to said liner ring.

5. The nozzle as set forth in claim 4, wherein a spring is placed between surfaces on said outer ring and said liner ring and biases said outer ring against a member with a plurality of ports which are selectively opened or closed by said outer ring to control the flow of air to said rear surface of said intermediate member.

6. The nozzle as set forth in claim 4, wherein a rotating linkage drives said liner ring to rotate, said liner ring having a plurality of spaced openings, said openings being selectively aligned with openings in a fixed surface to allow or block the flow of cooling air into said nozzle.

7. The nozzle as set forth in claim 6, wherein a bearing on said linkage is received within a slot in said liner ring.

8. The nozzle as set forth in claim 1, wherein said intermediate member is a sync ring defining a chamber for receiving pressurized air, and being connected to said actuator.

9. A method of operating a nozzle in a gas turbine engine comprising the steps of:
   (1) providing a plurality of flaps that may move to provide a desired cross-sectional area for a nozzle outlet, and providing an actuator structure having at least one intermediate member that moves the flaps; and
   (2) rotating a rotatable structure to control the flow of air flow to a rear surface of said intermediate structure, to either block or allow the flow of air to the intermediate structure dependent on system conditions, and further rotating said rotatable structure to control a flow of cooling air into an interior of said nozzle.

10. The method as set forth in claim 9, wherein said rotatable structure includes a liner ring controlling the flow of cooling air to the interior of the nozzle, and an outer ring for controlling the flow of cooling air to the rear surface of the intermediate member, said outer ring being constrained to rotate with said inner ring.

11. The nozzle as set forth in claim 8, wherein said sync ring drives a plurality of said flaps.

12. The nozzle as set forth in claim 11, wherein said sync ring can move independently from said flaps.

* * * * *